United States Patent
Daub et al.

(10) Patent No.: US 7,402,750 B2
(45) Date of Patent: Jul. 22, 2008

(54) CABLE LOOM

(75) Inventors: Klaus U. Daub, Duisburg (DE); Hans J. Buescher, Duesseldorf (DE)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 11/706,102

(22) Filed: Feb. 13, 2007

(65) Prior Publication Data

US 2007/0187135 A1 Aug. 16, 2007

(30) Foreign Application Priority Data

Feb. 13, 2006 (EP) .................................. 06002883

(51) Int. Cl.
*H02G 3/04* (2006.01)
(52) U.S. Cl. ...................... 174/72 A; 174/93
(58) Field of Classification Search ............... 174/72 A, 174/93; 296/155
See application file for complete search history.

(56) References Cited

U.S. PATENT DOCUMENTS

| 5,824,960 | A | | 10/1998 | Markling |
| 5,957,702 | A | * | 9/1999 | Nagai et al. ................... 439/34 |
| 6,107,570 | A | * | 8/2000 | Suzuki et al. ............. 174/72 A |
| 6,161,894 | A | * | 12/2000 | Chapman .................... 296/155 |
| 6,290,283 | B1 | * | 9/2001 | Fukumoto et al. ........... 296/155 |
| 6,494,523 | B2 | * | 12/2002 | Kobayashi .................. 296/155 |
| 6,723,923 | B2 | * | 4/2004 | Tsukamoto ................ 174/68.1 |
| 2002/0014348 | A1 | | 2/2002 | Aoki et al. |
| 2003/0121692 | A1 | | 7/2003 | Kato et al. |
| 2004/0139699 | A1 | * | 7/2004 | Dragov ........................ 53/429 |
| 2005/0092512 | A1 | | 5/2005 | Kogure et al. |

FOREIGN PATENT DOCUMENTS

EP 1241056 3/2002

* cited by examiner

*Primary Examiner*—Chau N Nguyen
(74) *Attorney, Agent, or Firm*—David P. Wood

(57) ABSTRACT

The invention relates to a cable loom, in particular for use in a motor vehicle, the cable loom comprising at least one electrical cable and a stretching device longitudinally engaging at least a section of the cable loom, wherein the stretching device exerts a force aligning the cable loom so as to be substantially free of curvature on the portion of the cable loom engaged by the stretching device.

11 Claims, 2 Drawing Sheets

CABLE LOOM

TECHNICAL FIELD

The present invention relates to a cable loom, in particular for use in motor vehicles. Cable looms such as cable harnesses comprise one or more cables which serve, for example, the transmission of signals or the supply of power.

BACKGROUND OF THE INVENTION

Known cable looms are often designed to be very flexible and pliable. Unfortunately, the desirability of flexibility in a cable loom often results in unwanted bulges and kinks in the cable loom, which can lead to damage to the cable loom.

Frequently, cable looms also have to be arranged in a movable manner. This can, for example, be the case when a cable loom is connected to a moving component, for example to a door. In certain states, a portion of the cable loom is then excessive and has to be stowed safely.

The frequently substantial stowage space of a cable loom portion to be stored is frequently disadvantageous. Frequently, unwanted noises also occur which are caused by the stowed cable loom portion (for example knocking on vibrations).

In most cases, the part of a cable loom to be moved must be guided through apertures. This guiding of the cable loom through apertures, such as on the opening or closing of a door, is often solved in an unsatisfactory manner.

SUMMARY OF THE INVENTION

It is the underlying object of the invention to provide a cable loom which can be stowed easily and can be guided simply through apertures. Furthermore, a method should be provided to stow a cable loom in a simple and safe manner.

This object is satisfied by the features of the independent claims.

The cable loom in accordance with the invention, which comprises at least one electrical cable, is wherein it is provided at least sectionally with a stretching device along its longitudinal extent. This stretching device exerts a force on the portion of the cable loom which comprises the stretching device to align the cable loom substantially free of curves. The cable loom in accordance with the invention therefore tends to align itself in a straight line due to the effect of the stretching device.

The stabilizing effect of the stretching device already enables a simple "threading" of the cable loom through apertures on the assembly of the cable loom in accordance with the invention. Flexible cable looms can only be pulled through apertures, whereas the cable loom in accordance with the invention can also be pushed through apertures. Even in cases where the cable loom has to be arranged in a movable manner, a stiffening of this type is advantageous since the movement of the cable loom can be effected both by a pulling force and by a pushing force.

Furthermore, the cable loom in accordance with the invention has no unwanted bulges, kinks and/or angled sections in its extent since they are prevented by the stretching effect of the stretching device.

The flexibility of the cable loom in accordance with the invention can be matched to the radii of curvature or forces to be expected. Depending on the area of application, a stretching device can be provided which has a stronger effect or a weaker effect. The stretching device can also only be provided sectionally along the longitudinal extent of the cable loom.

Advantageous embodiments of the invention are recited in the dependent claims, in the description and in the drawings.

In accordance with an embodiment of the cable loom in accordance with the invention, the stretching device is arranged such that it does not surround the cable loom in the peripheral direction. It is therefore neither tubular, nor does it surround the cable loom in the form of a spiral or a helix.

In a further embodiment, the cable loom is part of a cable harness which is bundled by at least one enveloping element. Enveloping elements of this type can, for example, be cable binders, clips or hoses. The enveloping elements ensure the cohesion of the individual cables of the cable harness and can, for example, also serve the protection of the cable harness from wear, moisture or temperature. They can also be provided for the bundling of the stretching device with the cables of the cable loom.

In accordance with an embodiment of the invention, the stretching device comprises at least one steel spring or a steel band (gauge strip). It can, for example, be a spring which extends parallel to the longitudinal extent of the cable loom. A deflection of the cable loom out of a straight-line alignment strains the spring transversely to its longitudinal axis. The restoring force has the effect that the cable loom is again aligned and stretched substantially in a straight line. A stretching device of this type can be realized simply and effectively and moreover also in a cost-favorable manner.

In accordance with a further advantageous embodiment, the cable loom in accordance with the invention is arranged at least partly in a cable stowage bag. It substantially comprises a pouch with a first and a second aperture. This pouch protects a temporarily excess cable loom portion and moreover damps noises which arise, for example, on vibrations by the cable loom.

Provision can be made for the portion of the cable loom arranged in the interior of the cable stowage bag to extend substantially in one plane. Provision can furthermore be made for this portion to form a loop in the interior of the cable stowage bag. The formation of the loop can be caused by the effect of the stretching device. An arrangement in a plane and/or in a loop is very space-saving and prevents inter alia an unintentional forming of knots in the cable loom.

The pouch of the cable stowage bag can be made of flexible material. Provision can be made for the material to be made of one or more layers of fabric material and/or foil material. A design of this type of the pouch material is cost-favorable, saves weight and damps noises which can arise due to the cable loom in a simple and efficient manner. The material can be selected in line with the demands such that the cable stowage bag exerts additional protective functions (electrical and thermal insulation, fire-inhibiting effect, protection from moisture and the like).

In accordance with a further advantageous embodiment, the cable loom is fixed with respect to a movement through one of the apertures of the cable stowage bag. This makes it possible to except specific portions of the cable loom from a loading with a pulling force, e.g. the portion between the cable stowage bag and the vehicle interior.

The cables 12 can be arranged in a different manner and do not have to be arranged in such a regular manner as shown in FIG. 1a. The cables 12 do not have to be only electrical cables, but can also be liquid and/or gas lines, optical cables or lines or cables of a different type, for example.

An installation part with a reception space can also be provided which is made available instead of or in addition to a cable stowage bag for the reception of a cable loom. This installation part can, for example, be a foamed part which receives the cable loom portion to be stowed in its interior. The installation parts can be integrated in a simple manner e.g. in the door trims of a vehicle and/or in the vehicle headlining.

BRIEF DESCRIPTION OF THE DRAWINGS

The invention will be described in the following purely by way of example with reference to advantageous embodiments and to the drawings. There are shown.

DESCRIPTION OF THE PREFERRED EMBODIMENT

Figure 1A:
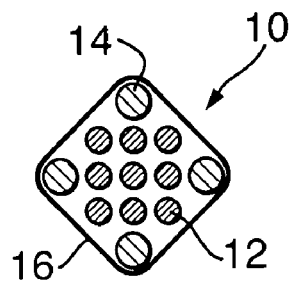
FIG. 1a is a schematic cross-section of an embodiment of a cable loom.

FIG. 1a schematically shows the cross-section of a cable loom 10 in accordance with the invention. It comprises a plurality of cables 12. The cables 10 can be arranged in a different manner and do not have to be arranged in such a regular manner as shown in FIG. 1a. The cables 10 do not have to be only electrical cables, but can also be liquid and/or gas lines, optical cables or lines or cables of a different type, for example. A plurality of stretching elements 14 are arranged on the cables 12. They serve the stabilization of the cable loom 10 and ensure that the cable loom adopts an extent free of curvature, or at least low in curvature, without the effect of external forces. The properties of the stretching device can be matched to the conditions of use and to the demands on the flexibility of the cable loom 10, for example by a suitable number of stretching elements 14 and/or by the choice of suitable elastic properties of the stretching elements 14. The stretching elements 14 can be springs, for example plate springs, steel wire springs or can be made of other different materials (e.g. plastic or metal). Simple elastic bars which are arranged along the cable loom 10 also develop the effect of a stretching device.

The cable loom 10 is surrounded by a protective envelope 16. A protective envelope of this type can be provided when the cable loom 10 should be protected from external influences. The protective envelope 16 can also contribute to the cohesion/bundling of the cable loom 10 in addition to its protective function. The cable loom 10 can also be held together by other means such as cable binders or clips.

Figure 1B:
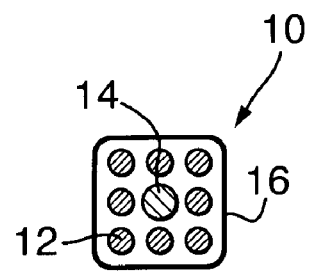
FIG. 1b is a schematic cross-section of a further embodiment of a cable loom.

FIG. 1b shows a further embodiment of the cable loom 10. In this embodiment, the stretching element 14 is arranged in the interior of the cable loom 10. The cables 12 of the cable loom 10 are in turn surrounded by the protective envelope 16. This embodiment is also characterized by its simple design which can be manufactured in a cost-favorable manner. Mixed forms of the two embodiments described above are likewise conceivable. The cable loom 10 can in particular be woven with the cables.

Figure 2A:
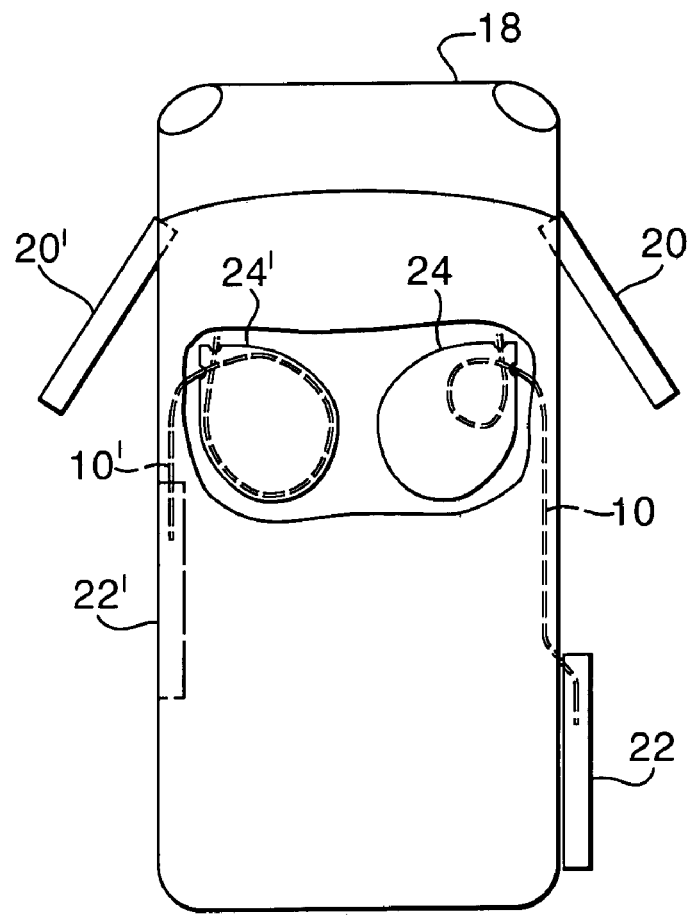
FIG. 2a is a schematic representation of a vehicle with cable stowage bags.

An example for the use and effect of a cable loom 10 in accordance with the invention is shown in FIG. 2a. It shows a vehicle 18 which is fitted with two front doors 20, 20' and two sliding doors 22, 22'. Different electrical consumers (not shown) in the sliding doors 22, 22' are connected to control units (not shown) and to a battery (not shown) of the vehicle 18 via cable looms 10, 10' (cable harnesses). The extent of the cable looms 10, 10' is shown only schematically.

The sliding door 22' of the left hand vehicle side is closed. The cable loom 10' leads from the sliding door 22' into a cable stowage bag 24'. The extent of the cable loom 10' is shown in the interior of the cable stowage bag 24' in broken lines. The cable loom 10' extends in a loop in the interior of the cable stowage bag 24' and exits the cable stowage bag 24' toward the front side of the vehicle. The further extent of the cable loom 10' is not shown.

The cable loom 10' presses against the inner walls of the cable bag 24' due to the stretching device of the cable loom 10' whose effect always seeks to increase the radius of curvature of the cable loom 10'. A knot in the extent of the cable loom 10' due to an uncontrolled stowing procedure can thus not occur.

The situation with an open sliding door 22 is shown on the right hand side of the vehicle. During the opening of the sliding door 22, the cable loom 10 is drawn out of the cable stowage bag 24. The portion of the cable loom 10 still located in the cable stowage bag 24 still forms a loop. A pulling force directed into the interior of the cable stowage bag 24 is exerted by the stretching device 10 onto the extent of the cable loom 10 between the cable stowage bag 24 and the sliding door 22. The cable loom 10 is automatically pulled back into the cable stowage bag 24 on the closing of the sliding door 22 by this pulling force. In addition, the pulling force ensures a proper alignment and an extent of the cable loom 10 which is in as straight a line as possible. It is thereby also prevented that the cable loom 10 is caught on the closing of the sliding door 22, 22'. The stretching effect of the stretching device of the cable loom 10 also facilitates the "threading" of the cable loom 10 through the diverse apertures of the vehicle body.

Figure 2B:
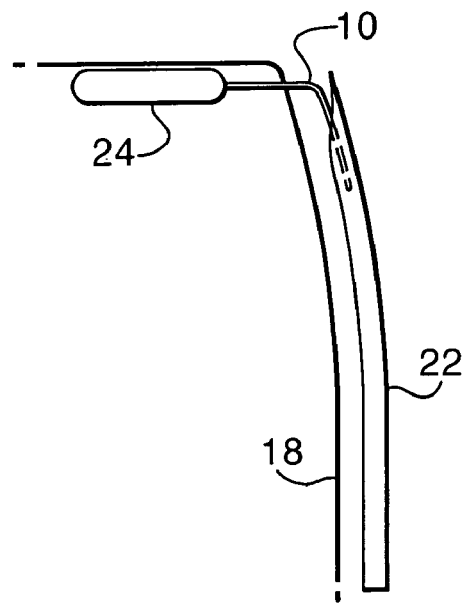
FIG. 2b is a schematic representation of the arrangement of a cable stowage bag in the roof of a vehicle.

FIG. 2b illustrates the arrangement of the cable stowage bag 24 in the roof of the vehicle 18. Provision can, however, also be made to attach the cable stowage bag 24 in the floor, in the doors or at other locations of the vehicle.

Figure 3:
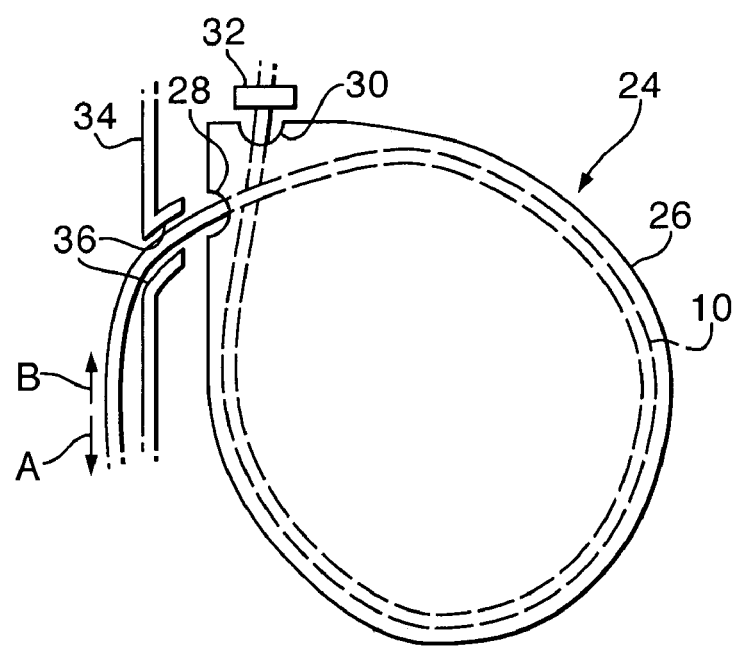
FIG. 3 is a schematic representation of a cable stowage bag.

FIG. 3 schematically shows the design of an embodiment of the cable stowage bag 24. The cable stowage bag 24 comprises a pouch 26. This comprises a door-side aperture 28 and a vehicle-side aperture 30. The cable loom 10 is prevented from moving through the vehicle-side aperture 30 by a fixing connection 32. This ensures that the cable loom 10 is not unintentionally loaded with a pulling force in the vehicle interior of the vehicle 18. The cable loom 10 is essentially freely movable in the interior of the pouch 26. The cable loom 10 is, however, automatically pressed toward the inner side of the pouch 26 by the stretching effect of the stretching device. On an opening of the sliding door 22, 22', the cable loom 10 is pulled out of the cable stowage bag 24 in the direction of movement A. For this purpose, a force has to be applied since the stretching device seeks to align the cable loom 10 free of curvature. This stretching effect therefore causes a pulling force which is directed into the cable stowage bag 24. This pulling force has to be overcome on the opening of the door. If the cable loom 10 passes through an aperture, for example in the body 34, in its extent, guide elements 36 are provided at the aperture to facilitate the passage through the cable loom 10.

If the sliding door 22 is closed, the cable loom 10 is pulled back into the cable stowage bag 24 by the pulling force described above (direction of movement B). The stiffening effect of the stretching device additionally facilitates the passage of the cable loom 10 through apertures (for example in the body).

The stretching device of the cable loom 10 thus always provides an appropriate pull for the stowing of the cable loom 10. The stretching device additionally acts advantageously on the extent of the cable loom 10 outside the cable stowage bag 24. Due to an aligning effect free of curvature, no unintended loops or kinks arise in the extent of the cable loom which could inter alia result in damage to the cable loom 10. The extent of the cable loom 10 is thus more controlled than with a conventional cable loom.

The invention claimed is:

1. A cable loom comprising at least one electrical cable and a stretching device longitudinally engaging at least a section of the cable;
   wherein the stretching device exerts a force aligning the cable so as to be substantially free of curvature on the portion of the cable engaged by the stretching device;
   wherein the cable loom is arranged at least partly in a cable stowage bag that comprises a pouch having a first aperture and a second aperture; and
   wherein the pouch is produced from one or more layers of flexible fabric material and/or foil material.

2. A cable loom in accordance with claim 1, wherein the stretching device is arranged so as to only partially surround the periphery of the cable loom.

3. A cable loom in accordance with claim 1, wherein the cable loom is part of a cable harness that is bundled by at least one enveloping element.

4. A cable loom in accordance with claim 1, wherein the stretching device comprises at least one steel spring.

5. A cable loom in accordance with claim 1, wherein the portion of the cable loom which is arranged in die interior of the cable stowage bag extends substantially in One plane.

6. A cable loom in accordance with claim 1, wherein the extent of the portion of the cable loom which is arranged in the interior of the cable stowage bag forms a loop.

7. A cable loom in accordance with claim 1, wherein the cable loom is fixed wit respect to a movement through one of the apertures.

8. A cable loom comprising at least one electrical cable and a stretching device longitudinally engaging at least a section of the cable;
   wherein the stretching device exerts a force aligning the cable so as to be substantially free of curvature on the portion of the cable engaged by the stretching device;
   wherein the cable loom is arranged at least partly in a cable stowage bag that comprises a vouch having a first aperture and a second aperture; and
   wherein the cable stowage bag is installed in the roof of a vehicle.

9. A method of stowing a cable loom that includes at least one electrical cable, the method comprising the steps of:
   providing a stiffening device to longitudinally engage at least a section of the cable so as to exert a force aligning the cable in a desired orientation;
   arranging the cable loom at least partly in a cable stowage bag that comprises a pouch produced from one or more layers of flexible fabric material, the pouch having a first aperture and a second aperture.

10. A cable loom-comprising at least one electrical cable and a stiffening device longitudinally engaging at least a section of the cable;
    wherein the stiffening device exerts a force aligning the cable along a desired curvature on the portion of the cable engaged by the stiffening device;
    wherein the cable loom is arranged at least partly in a cable stowage bag that comprises a pouch having a first aperture and a second aperture; and
    wherein the pouch is produced from one or more layers of flexible fabric material and/or foil material.

11. A cable loom comprising at least one electrical cable and a stiffening device longitudinally engaging at least a section of the cable;
    wherein the stiffening device exerts a force aligning the cable along a desired curvature on the portion of the cable engaged by the stiffening device;
    wherein the cable loom is arranged at least partly in a cable stowage bag that comprises a pouch having a first aperture and a second aperture; and
    wherein the cable stowage basis installed in the roof of a vehicle.

* * * * *